United States Patent

[19]

Humphries

[11] 3,923,945

[45] Dec. 2, 1975

[54] METHOD OF MAKING CORROSION RESISTANT METAL FIBER REINFORCED PLASTIC COMPOSITES

[75] Inventor: Darral V. Humphries, Allentown, Pa.

[73] Assignee: Bethlehem Steel Corporation, Bethlehem, Pa.

[22] Filed: Jan. 22, 1974

[21] Appl. No.: 435,560

Related U.S. Application Data

[60] Continuation-in-part of Ser. No. 254,328, May 17, 1972, abandoned, which is a division of Ser. No. 132,017, April 7, 1971, Pat. No. 3,687,798, which is a continuation-in-part of Ser. No. 853,071, Aug. 26, 1969, abandoned.

[52] U.S. Cl. ............. 264/111; 264/115; 264/122; 264/126
[51] Int. Cl.² ........................................... B22F 9/00
[58] Field of Search ............ 264/111, 115, 122, 126

[56] References Cited
UNITED STATES PATENTS

| | | | |
|---|---|---|---|
| 3,410,936 | 11/1968 | Juras | 264/111 |
| 3,539,672 | 11/1970 | Valyi | 264/111 |
| 3,678,145 | 7/1972 | Boes | 264/115 |

Primary Examiner—Robert F. White
Assistant Examiner—J. R. Hall
Attorney, Agent, or Firm—Joseph J. O'Keefe; Charles A. Wilkinson

[57] ABSTRACT

A method of making metal fiber reinforced plastic composite from a mixture of ferrous fibers and sacrificial metal fibers. The sacrificial metal fibers may be ferrous fibers coated with a sacrificial metal or may be composed throughout of a sacrificial metal such as zinc having a greater electro negativity than iron. The fibers may also comprise ferrous fibers coated with a sacrificial metal mixed with solid sacrificial metal fibers. The ferrous and sacrificial metal fibers are cut into fairly short lengths and are then blended thoroughly together in predetermined ratios with plastic powder in suitable blenders to form a uniform mix having the sacrificial metal fibers thoroughly dispersed throughout the ferrous metal fibers and the plastic. The blend of metal fibers and plastic is then placed in a mold or other plastic forming apparatus and molded into a desired shape. The final molded plastic composite is corrosion resistant on cut surfaces due to the presence of the sacrificial metal fibers within a distance of the ferrous fibers effective to form galvanic corrosion couples between the ferrous and sacrificial metal fibers.

10 Claims, 6 Drawing Figures

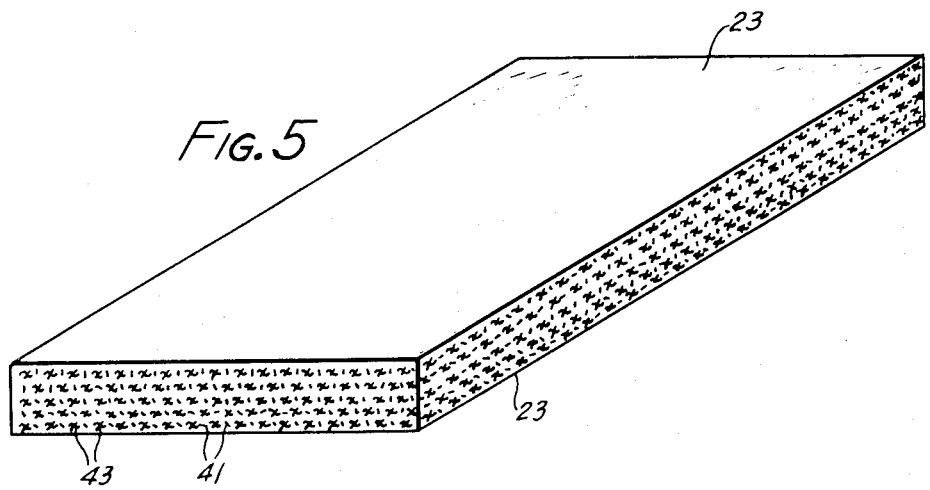
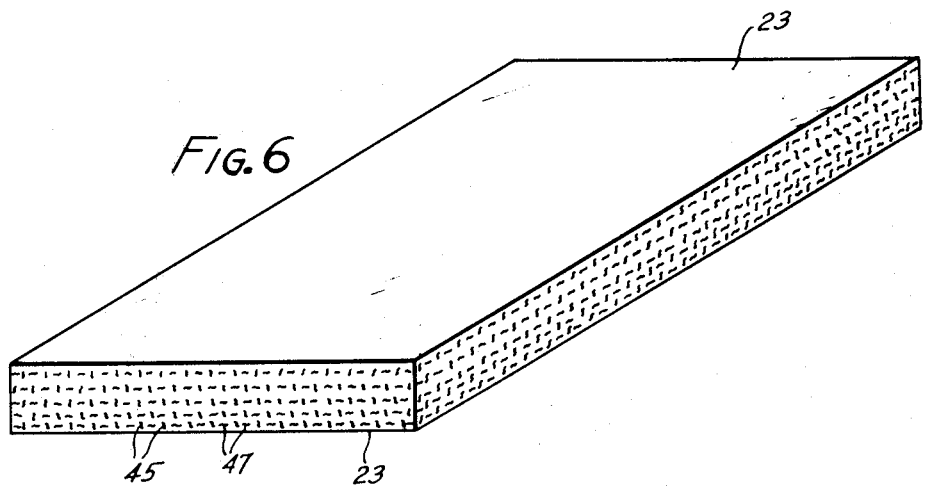

METHOD OF MAKING CORROSION RESISTANT METAL FIBER REINFORCED PLASTIC COMPOSITES

CROSS-REFERENCES TO RELATED APPLICATIONS

This No. is a continuation-in-part of application Ser. No. 254,328 filed May 17, 1972, now abandoned, which was in turn a division of application Ser. no. 132,017 filed Apr. 7, 1971, now U.S. Pat. No. 3,687,798 issued Aug. 29, 1972, which application Ser. No. 132,017 was in turn a continuation-in-part of U.S. application Ser. No. 853,071 filed Aug. 26, 1969 and now abandoned.

BACKGROUND OF THE INVENTION

This invention relates to a method of making metal fiber reinforced plastic composites and particularly corrosion resistant plastic metal reinforced composites.

Steel fiber reinforced plastic composites are very attractive technically and economically. The plastic provides lightness not attainable with metallic sheets while the fiber reinforcing provides strength unattainable with plastic alone, and greater stiffness than can be attained with glass or aluminum fiber reinforcing. If the steel fiber is in the form of very thin relatively short wires having, for example, the consistency of chopped steel wool, the steel reinforced plastic composite may be extruded or otherwise shaped by normal plastic forming machinery and the finished composite pieces may be cut to shape with ordinary hand or power woodworking tools. When the plastic is cut or abraded, the ferrous metal is exposed and tends to quickly oxidize causing unsightly and detrimental rust areas along the cut section of the composite.

SUMMARY OF THE INVENTION

The foregoing corrosion difficulties have been alleviated by the present invention. In accordance with the invention small first fibers or strips of zinc or similar metal, or ferrous fibers coated with zinc, or such similar metal, are positioned within the plastic composite adjacent to second small fibers, or strips of ferrous metal, or ferrous metal having a non-ferrous metallic coating. The first fibers or strips are positioned so that they are in electrical contact with the second fibers or strips at isolated points within the body of the composite and are exposed on the surface of the composite within approximately one-eighth of an inch of the second fibers or strips to be protected from oxidation in the case of the use of zinc fibers or within a distance effective to form a galvanic corrosion couple with the nearest ferrous fiber or fibers in the case of various sacrificial metal fibers including zinc.

BRIEF DESCRIPTION OF THE DRAWINGS

FIG. 5 is an isometric view of another embodiment of this invention.

FIG. 6 shows another alternate embodiment of this invention.

DESCRIPTION OF THE PREFERRED EMBODIMENTS

Figure 1:
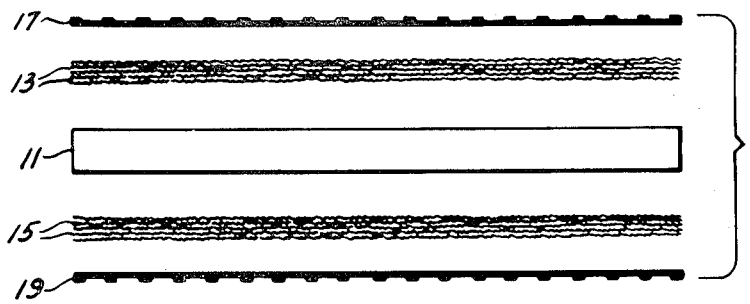
FIG. 1 is a lateral exploded view of a series of layers of materials prior to compression together to form a corrosion resistant plastic composite according to the present invention.

FIG. 1 shows a series of layers of materials for the formation of a corrosion resistant plastic composite.

A central layer of so-called A.B.S. or acrylonitrilebutadiene-styrene thermoplastic sheet 0.060 inch thick is disposed as the potential central layer 11 of the composite.

Above and below the central thermoplastic sheet layer 11 are two layers 13 and 15 of several thin sheets of steel wool mat.

Lastly above and below layers 13 and 15 are two outer layers 17 and 19 of thin strips of zinc ribbon 0.003 inch in thickness and 0.006 inch in width laid up in a square grid pattern with one-eighth of an inch opening between the ribbons. If desired the strips may be interwoven to provide an easily handled screen of zinc ribbons.

Alternately, layers 13 and 15 may be ferrous alloys or a metal coated ferrous fiber. Also, layers 17 and 19 may be zinc or other sacrificial metal, or composites such as galvanized ferrous fiber or sacrificial metal alloys.

The foregoing layers may be placed with a planar compression mold of any suitable construction, not illustrated, such as is well understood in the art, where the layers are subjected to 1,000 pounds per square inch pressure perpendicular to the plane of the laminate and heated for approximately 15 minutes at 350° F., after which the laminates are cooled in the pressure mold.

Figure 2:
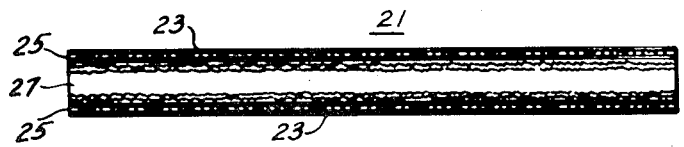
FIG. 2 is a lateral view of the materials shown in FIG. 1 composited together to form a sheet

A laminated composite 21 as shown in FIG. 2 results from the foregoing steps. This composite has a thin external thermoplastic skin 23 of A.B.S. resin derived from the original central layer of A.B.S. resin, adjoining layers 25 comprised of A.B.S. resin, zinc ribbon and steel wool, and a central layer 27 comprised of A.B.S. resin and steel wool.

Figure 3:
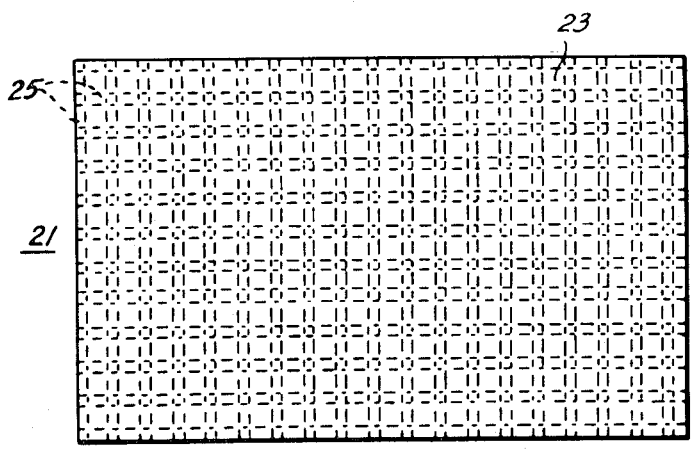
FIG. 3 shows a top view of the sheet shown in FIG. 2.

The laminate composite 21 shown in FIGS. 2 and 3 may be cut with an ordinary saw and the steel wool fibers exposed at the cut edges will show no corrosion over extended periods when exposed to extremely corrosive conditions. Composites formed indentically with composite 21 with the exception that the layers 25 containing the zinc ribbon are not present will show severe corrosion along the cut edges within a very short period.

The grid pattern of the zinc ribbon containing layers 25 may be seen through the translucent plastic in FIG. 3. It will be understood that any other pattern of zinc ribbon and ferrous fibers will be equally effective so long as no ferrous fiber exposed on any surface of the composite is spaced significantly more than approximately one eighth of an inch from an adjoining zinc ribbon or fiber and so long as there is at least occasional effective electrical contact of the zinc and ferrous ribbons, wires or fibers within the composite with each other so that a galvanic corrosion couple is effectively formed. The ribbons of zinc and the steel wool in the above example are forced into effective electrical contact with each other in the composite 21 by the pressure of the molding device.

Figure 4:
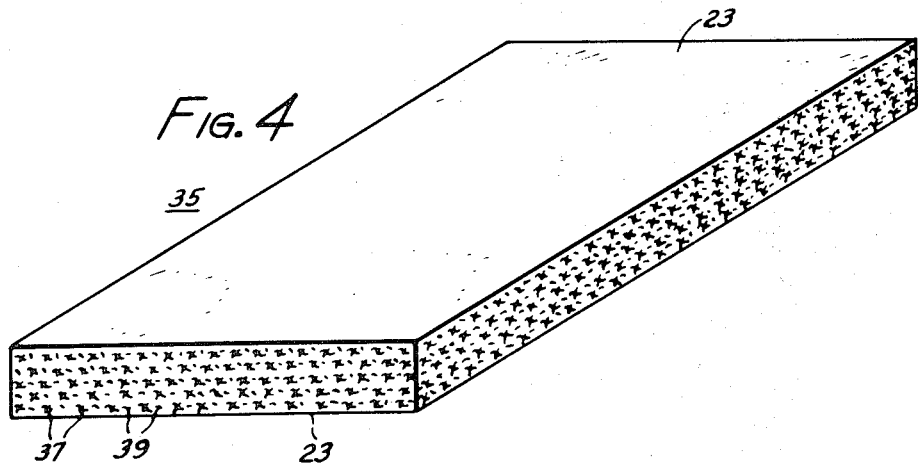
FIG. 4 is an isometric view of a second embodiment of the invention making use of a mixture of zinc wool and steel wool as the reinforcing element.

Another very desirable embodiment of the invention is shown in FIG. 4.

In FIG. 4 a thermoplastic composite 35 has been molded from polypropylene with ferrous fibers 37 disposed throughout in the form of steel wool interspersed with fibers of zinc wool 39. The relative percentages, distribution and compaction of the ferrous fibers 37 and zinc fibers 39 are such that no ferrous fiber 37 is spaced significantly more than one eighth of an inch from the nearest adjoining zinc fiber 39 and the ferrous fibers are in at least occasional effective electrical contact with the zinc fibers throughout the composite. A.B.S. thermoplastic is also very desirable as a matrix for a composite including zinc wool. The steel wool and zinc wool may be applied in separate but closely adjacent layers but are preferably mixed together prior to placing in the plastic matrix of the composite. Desirably, the steel wool and zinc wool may be manufactured together in a suitable ratio to provide a single bundle of ferrous and zinc fibers ready for use. The mixture of ferrous and zinc fibers can be either in the form of a loose mat or dry blend of short chopped ferrous and zinc fibers.

In an alternate embodiment shown in FIG. 5, coated ferrous fibers 41 in wool form and zinc fibers 43 in wool form are interspersed in a plastic matrix. The coating on ferrous fibers 41 is a non-ferrous sacrificial or non-sacrificial metal. The article composition is similar to FIG. 4, in which 23 is a thermoplastic resin and in which the fibers are dispersed in a manner similar to that previously described for FIG. 4.

In the alternate embodiment shown in FIG. 6, ferrous fibers 45 and ferrous fibers 47 coated with a sacrificial metal, e.g. zinc, are interspersed in a plastic matrix. The article composition is similar to FIG. 5 in which 23 is a thermoplastic resin and in which the fibers are dispersed in a manner similar to that previously described for FIG. 5.

As used herein, a sacrifical metal and sacrificial metal coating means a metal or metal coating having a greater electro negativity than iron. While a non-sacrificial metal and a non-sacrificial metal coating means a metal or metal coating having an electro negativity equal to or less than that of iron.

In addition, the term ferrous fibers is meant to include a ferrous alloy fiber wherein iron is the predominant element.

While zinc is the preferable galvanic metal, the broad invention is not limited to the use of zinc, but encompasses the use of other sacrificial metals and alloys, and sacrificial metal composites having at least one metal constituent with a greater electro negativity than iron. Zinc and zinc alloys are, however, the preeminent materials for this purpose.

Other suitable plastics including thermosetting as well as thermoplastic resins will be found suitable as the matrix of the composite under appropriate circumstances. The plastic composites may be molded or otherwise formed into any desired shape in addition to the strips illustrated.

While both layered composites, such as illustrated in FIGS. 2 and 3, and uniform mixes of zinc and steel wool fibers and zinc wool, such as illustrated in FIGS. 4 and 5, are desirable for specific uses, the uniform mix type is particularly adaptable for rapid production and provides very uniform properties in the finished product. On the other hand the layered type of composite is adaptable for the production, for instance, of composites having stiffer and harder surface layers for wear resistance, particularly if the steel wool layers are disposed adjacent the surface of the composite.

Uniform mixes can be easily prepared by mixing the proper proportions of chopped metallic wool fibers or ribbons together with dry particles, preferably in the form of a powder, of the desired resin in a high speed blender of any suitable type, such as a blender having a propeller type mixing element, and then pouring the uniform dry blend into suitable molds which are subsequently heated to fuse the plastic into a matrix for the metallic fibers. The molds may be subjected to compression during or subsequent to heating to improve the density of the composite.

Alternately, blending may be separate or combined with molding of the composite in, for example, injection molding, extrusion forming or other plastic composite forming processes well known in the art.

Very satisfactory blending can be accomplished in a Prodex Henschel Model 2-JSS blender. The blender bowl of this apparatus contains four horizontal propeller-like blades which rotate at a speed of 1,800–3,600 R.P.M.'s and force the mixture to be blended between the wall of the bowl and an adjustable static vertical vane. The shearing forces between the rotor and the stator effectively mix and disperse diverse materials in a short time.

The fibers for most efficient mixing should be between about one-eighth of an inch and about one-half an inch or somewhat more in length. Very satisfactory mixing has been attained using the metal fibers in the general range of one-quarter inch in length. The sacrificial metal fibers and ferrous fibers need not necessarily be the same length. Some relatively brittle metal fibers such as ferrous fibers derived from steel wool may suffer attrition and reduction in length during the blending process.

The plastic resin may be in the form of powder, granules, or pellets of the resin although it will be evident that in general the finer the resin particles the better blending will be obtained. The use of powdered resin may be necessary where compression molding is to be carried out. A plastic powder having a fineness in the range of minus 100 mesh size has been found to be very satisfactory.

In one example of my invention one-quarter inch long metal fibers were chopped from 0.0025 inch diameter steel and zinc wire. Five hundred grams of steel fibers and 52 grams of zinc fibers were weighed and placed in the blender bowl of a Henschel blender together with 294 grams of minus 100 mesh A.B.S. type resin powder and blended for 5 minutes at 2,600 R.P.M.'s. After blending it was found that all of the metal fibers were uniformly blended together and the mixture or blend was subsequently molded into a metal fiber reinforced plastic sheet using a suitable mold and a mold temperature of 360° F. and a pressure of 1,000 PSI applied for 15 minutes. The zinc fibers were distributed throughout the sheet within such distance of the ferrous fibers as to effectively form galvanic corrosion couples on any subsequently cut or original surfaces of the sheet and so that each ferrous fiber was within at least one-eighth of an inch of at least one zinc fiber and the fibers were in at least occasional effective electrical contact with each other within the composite body.

In a second example of my invention the composition and the blending of the mixture was the same as in example 1. However, the steel fibers were derived from one-quarter inch lengths of steel wool mat approximately 4 inches wide. After blending for 2 minutes at 2,200 R.P.M.'s the steel fibers and zinc fibers were uniformly blended or distributed together with the resin powder and upon subsequent molding of the mixture a fiber reinforced plastic composite having the same characteristics as recited for the composite made in example 1 was obtained.

While the use of a Henschel type blender has been described above generally and in connection with the foregoing examples, it will be readily understood by one skilled in the art that other types of apparatus and equipment which would accomplish the same thorough type of blending or mixing could also be used.

Where the metal reinforced plastic composite of the invention is to be formed or preformed by a process other than strict molding such as by injection molding, extrusion molding or other plastic forming processes well known in the art, other types of blending or mixing apparatus may be used to attain a thorough blending combined with, for example, extrusion. For example, a so-called "Mixtruder" made by J. H. Day Company having 180° spiral agitator blades, a 15 horsepower agitator drive and a 10 horsepower extrusion screw drive with proper jacketing for heating to 500° F. can be used. Plastic A.B.S. or styrene resin powder in the proper proportions may added to the Mixtruder and mixed for fifteen or so minutes with ferrous fibers and sacrificial metal fibers and the mixture then extruded through the heated die of the Mixtruder to form a preformed or molded product having dimensions similar to the dimensions of the exit die orifice of the Mixtruder. Obviously other similar suitable apparatus could also be used to uniformly blend and mold the plastic composites of the invention, the important factor being to attain a thorough and uniform blending of a proper mix of the plastic powder, ferrous fibers and sacrificial metal fibers so that the sacrificial metal fibers are evenly distributed and each ferrous fiber is within a distance of at least one sacrificial metal fiber effective to form a galvanic corrosion couple between the two dissimilar metals. The effective distance for ferrous and zinc fibers is about one-eighth of an inch or less. Other distances might be necessary if other types of sacrificial metals were used and the proportions of the ferrous fibers and the particular sacrificial metal fibers would then be adjusted until the required relationship is attained in the final molded article. As used in places in the present specification the terms "molded" and "molding" are used to refer not ony to molding per se as usually understood, but also to other types of hot forming operations in which a final preformed plastic article is attained. The term segmented fiber is used to refer to short lengths of metal fibers obtained by severing or chopping up longer metal fibers or wires or to any wire segments having a fairly restricted length.

When the relative percentages and distribution of the ferrous fibers and sacrificial metal fibers in the solidified resin are such that substantially no ferrous fiber is spaced from at least one sacrificial metal fiber along a cut surface of the final solidified plastic composite more than the distance effective to form a galvanic corrosion couple between substantially each ferrous fiber and the nearest sacrificial metal fiber and the ferrous fibers are in at least occasional electrical contact with the sacrificial metal fibers throughout the solidified resin, a very effective and satisfactory corrosion resistance will be obtained in the metal reinforced plastic composite particularly along any cut edges or other places where the reinforcing fibers are exposed.

I claim:
1. A method of making corrosion resistant metal reinforced plastic composites comprising:
   a. severing ferrous metal wires into discrete segments of ferrous metal fibers,
   b. severing sacrificial metal wires having a greater electronegativity than iron into discrete segments of sacrificial metal fibers,
   c. uniformly blending for a time in a blending apparatus predetermined proportions of the segmented ferrous metal fibers, the segmented sacrificial metal fibers and dry granules of a resin selected from the group consisting of thermoplastic and thermosetting resins together into a uniform mix of ferrous metal fibers, sacrificial metal fibers and resin in a ratio in a uniform dry mix such that upon subsequent fusion and solidification of the resin the relative percentages and distribution of the ferrous fibers and sacrificial metal fibers in the solidified resin are such that substantially no ferrous fiber is spaced from a sacrificial metal fiber along a cut surface of the solidified composite more than the distance effective to form a galvanic corrosion couple between substantially each ferrous fiber and the nearest sacrificial metal fiber and the ferrous fibers are in at least occasional electrical contact with the sacrificial metal fibers throughout the solidified resin,
   d. directing said blend of ferrous metal fibers, sacrificial metal fibers and resin granules into a molding device,
   e. heating and pressurizing the resin granules in said molding device to fuse and coalesce said resin into a plastic matrix throughout which said ferrous and sacrificial metal fibers are uniformly distributed in the relationship described in step (c) above, and
   f. cooling said plastic matrix to cause solidification of said plastic matrix about said ferrous and sacrificial metal fibers to form a metal reinforced plastic composite.

2. A method of making a corrosion resistant metal reinforced plastic composite according to claim 1 wherein the sacrificial metal fibers are comprised of a ferrous metal core and an outer layer of sacrificial metal.

3. A method of making a corrosion resistant metal reinforced plastic composite according to claim 2 wherein the ferrous and sacrificial metal fibers are between about one-eighth of an inch and one-half of an inch in length.

4. A method of making a corrosion resistant metal reinforced plastic composite according to claim 3 wherein the sacrificial metal is zinc and the ratio of the mix of the ferrous fibers, sacrificial metal fibers and resin is such that substantially no ferrous fiber is significantly more than one-eighth of an inch from the nearest adjoining zinc fiber after solidification of the matrix plastic.

5. A method of making a corrosion resistant metal reinforced plastic composite according to claim 1 wherein the sacrificial metal is zinc and the ratio of the mix of the sacrificial metal fibers, ferrous fibers and resin is such that substantially no ferrous fiber is spaced significantly more than one-eighth of an inch from the nearest adjoining zinc fiber after solidification of the matrix plastic.

6. A method of making a corrosion resistant metal reinforced plastic composite according to claim 5 wherein the ferrous and sacrificial metal fibers are between about one-eighth of an inch and one-half of an inch in length.

7. A method of making a corrosion resistant metal reinforced plastic composite comprising:
   a. chopping steel wool into descrete segments of ferrous metal fibers,
   b. chopping a metal wool comprised of a sacrificial metal having a greater electronegativity than iron into discrete segments of sacrificial metal fibers,
   c. uniformly blending for a time in a blending apparatus predetermined proportions of the segmented ferrous metal fibers, the segmented sacrificial metal fibers and dry granules of a resin selected from the group consisting of thermoplastic and thermosetting resins together into a uniform mix of ferrous metal fibers, sacrificial metal fibers and resin in a ratio in a uniform dry mix such that upon subsequent fusion and solidification of the resin the relative percentages and distribution of the ferrous fibers and sacrificial metal fibers in the solidified resin are such that substantially no ferrous metal fiber is spaced from a sacrificial metal fiber along a cut surface of the solidified composite more than the distance effective to form a galvanic corrosion couple between substantially each ferrous metal fiber and the nearest sacrificial metal fiber and the ferrous fibers are in at least occasional electrical contact with the sacrificial metal fibers throughout the solidified resin,
   d. directing said blend of ferrous fibers, sacrificial metal fibers and resin granules into a mold,
   e. heating and pressurizing the resin granules in said mold to fuse and coalesce said resin into a plastic matrix throughout which said ferrous and sacrificial metal fibers are uniformly distributed in the relationship described in step (c) above, and
   f. cooling said plastic matrix to cause solidification of the plastic matrix about the ferrous and sacrificial metal fibers in said mold and subsequently removing the solidified corrosion resistant metal reinforced plastic composite therefrom.

8. A method of making a corrosion resistant metal reinforced plastic composite according to claim 7 wherein the sacrificial metal fibers are comprised of a ferrous metal core and an outer layer of sacrificial metal.

9. A method of making a corrosion resistant metal reinforced plastic composite according to claim 8 wherein the sacrificial metal is zinc and the ratio of the mix of the ferrous fibers, sacrificial metal fibers and resin is such that substantially no ferrous fiber is spaced more than one-eighth of an inch from the nearest adjoining zinc fiber after solidification of the matrix plastic.

10. A method of making a corrosion resistant metal reinforced plastic composite according to claim 7 wherein the sacrificial metal fibers are zinc fibers and the ratio of the mix of the ferrous fibers, sacrificial metal fibers and resin is such that substantially no ferrous fiber is spaced more than one-eighth of an ich from the nearest adjoining zinc fiber after solidification of the plastic.

* * * * *